(12) United States Patent
Togawa et al.

(10) Patent No.: US 9,200,110 B2
(45) Date of Patent: Dec. 1, 2015

(54) POLYESTER BLOW-MOLDED ARTICLE AND METHOD FOR MOLDING POLYESTER BLOW-MOLDED ARTICLE

(71) Applicant: TOYOBO CO., LTD., Osaka (JP)

(72) Inventors: Keiichiro Togawa, Shiga (JP); Hiroshi Shibano, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 14/391,225

(22) PCT Filed: Apr. 5, 2013

(86) PCT No.: PCT/JP2013/060457
§ 371 (c)(1),
(2) Date: Oct. 8, 2014

(87) PCT Pub. No.: WO2013/154043
PCT Pub. Date: Oct. 17, 2013

(65) Prior Publication Data
US 2015/0080544 A1    Mar. 19, 2015

(30) Foreign Application Priority Data
Apr. 11, 2012 (JP) ................................ 2012-090026
Dec. 12, 2012 (WO) .................. PCT/JP2012/082173

(51) Int. Cl.
C08G 63/02 (2006.01)
C08G 63/183 (2006.01)
C08G 63/85 (2006.01)
B29C 49/00 (2006.01)
C08G 64/00 (2006.01)
B29K 67/00 (2006.01)
B29L 31/00 (2006.01)

(52) U.S. Cl.
CPC .......... *C08G 63/183* (2013.01); *B29C 49/0005* (2013.01); *C08G 63/85* (2013.01); *B29K 2067/003* (2013.01); *B29L 2031/7158* (2013.01)

(58) Field of Classification Search
CPC .................................................... C08G 63/866
USPC .................................. 528/271, 272, 279, 285
See application file for complete search history.

(56) References Cited

U.S. PATENT DOCUMENTS

| | | | |
|---|---|---|---|
| 4,264,558 A | 4/1981 | Jacobsen | |
| 4,463,121 A | 7/1984 | Gartland et al. | |
| 6,346,070 B1 * | 2/2002 | Ohmatsuzawa et al. | 528/279 |
| 6,392,005 B1 | 5/2002 | Jen | |
| 2004/0176564 A1 | 9/2004 | Yamamoto et al. | |
| 2013/0139883 A1 | 6/2013 | Togawa et al. | |

FOREIGN PATENT DOCUMENTS

| | | |
|---|---|---|
| CN | 1942504 A | 4/2007 |
| JP | 59-6216 | 2/1984 |
| JP | 59-62660 | 4/1984 |
| JP | 60-56606 | 12/1985 |
| JP | 62-227947 | 10/1987 |
| JP | 1-121334 | 5/1989 |
| JP | 3-47830 | 2/1991 |
| JP | 3-174441 | 7/1991 |
| JP | 4-345656 | 12/1992 |
| JP | 2002-293904 | 10/2002 |
| JP | 2003-327808 | 11/2003 |
| JP | 2003-327809 | 11/2003 |
| JP | 2004-190004 | 7/2004 |
| JP | 2006-282697 | 10/2006 |
| JP | 3897756 | 1/2007 |
| JP | 2007-138154 | 6/2007 |
| JP | 4678073 | 4/2011 |

OTHER PUBLICATIONS

Chinese Office Action mailed May 6, 2015, in counterpart Chinese Application No. 201380018620.1 (with English translation).
International Search Report issued Jul. 9, 2013 in International (PCT) Application No. PCT/JP2013/060457.

* cited by examiner

*Primary Examiner* — Terressa Boykin
(74) *Attorney, Agent, or Firm* — Wenderoth, Lind & Ponack, L.L.P.

(57) ABSTRACT

The present invention is directed to a heat-resistant polyester blow-molded article made of a polyester resin composition containing 0.035 to 1.75 equivalent/ton of a hindered phenol structural unit and containing at least one selected from the group consisting of antimony compounds as a polymerization catalyst, the cyclic trimer content thereof being less than or equal to 0.5% by mass, the acetaldehyde content thereof being less than or equal to 50 ppm and the intrinsic viscosity thereof being 0.68 to 0.90 dL/g. The present invention enables efficient production of a molded article excellent in transparency and heat-resistant dimensional stability, in particular a heat-resistant blow-molded article. Moreover, according to the present invention, there are provided a polyester resin composition which is excellent in long-term continuous moldability and hardly stains a mold and a molded article prepared therewith, and a method for molding a polyester blow-molded article using the polyester resin composition.

11 Claims, No Drawings

POLYESTER BLOW-MOLDED ARTICLE AND METHOD FOR MOLDING POLYESTER BLOW-MOLDED ARTICLE

TECHNICAL FIELD

The present invention relates to a heat-resistant polyester blow-molded article, and particularly relates to a heat-resistant polyester blow-molded article which is prepared with a polyester resin composition excellent in long-term continuous moldability at the time of melt molding and is excellent in transparency and heat-resistant dimensional stability. Moreover, at the time of continuously molding the polyester resin composition of the present invention into a heat-resistant blow-molded article, the blow-molded article has a characteristic that excellent transparency is maintained over a long period of time.

BACKGROUND ART

A polyester whose main repeating unit is ethylene terephthalate (hereinafter sometimes abbreviated as PET) has been employed as a material of a container for a carbonated beverage, juice, mineral water and the like by virtue of its excellent characteristics such as transparency, mechanical strength, heat resistance and gas barrier properties, and the prevalence thereof is remarkable. In these applications, a polyester bottle is hot-filled with a beverage sterilized at a high temperature and moreover a polyester bottle is sterilized at a high temperature after being filled with a beverage. However, in an ordinary polyester bottle, a problem of contraction and deformation occurs at the time of such a hot filling treatment or the like.

As a method for enhancing the heat resistance of a polyester bottle, there has been proposed a method for subjecting the bottle cap part to a heat treatment to heighten the degree of crystallinity or subjecting the stretched bottle to heat fixation. In particular, in the case where the crystallization in the cap part is insufficient or there is a great variation in the degree of crystallinity, the sealing with a cap is unsatisfactory and leakage of the contents is sometimes caused.

In the case of a polyester bottle for beverages requiring hot filling such as a fruit juice beverage, oolong tea and mineral water, as described above, a method for subjecting a preform or the molded cap part of a bottle to a heat treatment to crystallize it is commonly employed. With regard to such a method, that is, a method for subjecting the cap part and the shoulder part to a heat treatment to enhance the heat resistance, since the productivity is largely affected by the time and temperature for performing the crystallization treatment, it is preferred that the raw material be PET having a high crystallization speed which can be treated at a low temperature and in a short time.

On the other hand, the barrel part is required to be transparent even after being subjected to a heat treatment on molding so as not to deteriorate the visibility of the color tone of the bottle contents, and the cap part and the barrel part are required to have characteristics contradictory to each other.

Moreover, in order to enhance the heat resistance of the bottle barrel part, a method for removing a molded item obtained by stretch blow molding from a blow mold for molding and then holding the molded item in a mold for heat fixation to be subjected to heat fixation (for example, see Patent Document 1), and a method for performing heat fixation simultaneously with stretch blow molding in a mold for blow molding (for example, see Patent Document 2) have been known. Moreover, a method for performing a heat treatment simultaneously with stretch blow molding in a primary mold, removing the molded item, and then subjecting the molded item to blow molding in a secondary treatment mold without subjecting the item to cooling (for example, see Patent Document 3) has also been known.

However, when the long-term continuous molding of bottles is continued by using only one mold in such a method, with the long-term operation, the resulting bottle is whitened, the transparency deteriorates, and only bottles having no commercial value are obtained. It has been found that this is because deposits resulting from PET stick to the mold surface, and as a result thereof, the deposits become mold stains, and these mold stains are transferred to the surface of a bottle. Particularly, in recent years, the molding speed of the bottle has been increased for reduction in costs, and shortening of the heating time for crystallization of the cap part and the mold stains have become a greater problem from an aspect of productivity.

Moreover, a stretched film is produced by extruding PET into a sheet-like object and stretching the object in the biaxial directions. At this time, there is a problem that deposits resulting from PET stick to a cooling roll and a stretching roll for the unstretched film, the runnability for production of a sheet-like object or a stretched film is adversely affected, and moreover, the transparency of the resultant product also deteriorates.

To cope with the problem of such mold stains, a method for reducing the cyclic trimer which is a main component of the deposits on the mold surface by previously subjecting PET to solid phase polymerization has hitherto been performed. In this method, since the cyclic trimer is regenerated at the time of remelting and parison molding, the effect is insufficient. Moreover, a method for treating a polyester with water of 90 to 110° C. to suppress the activity of the catalyst and controlling the generation of the cyclic trimer at the time of parison molding (for example, see Patent Documents 4 and 5) has been disclosed. However, in this method, the fixed cost is increased since the facility investment for the water treatment is required. Moreover, the mold stains are roughly reduced, but the reduction is still insufficient, and it has been found that there are cases where a sufficient effect cannot be obtained. Particularly, in the case of producing a small heat-resistant blow-molded article by the continuous long-term molding with a high-speed molding machine, the accumulation of deposits on the heated mold is quite significant. Since there occur problems such that great labor is required for cleaning the mold as well as the transparency of the resultant molded article considerably deteriorates due to the deposits, a solution by a less expensive method has been desired.

Furthermore, there has been proposed a polyester providing a blow-molded article which undergoes little thermal deterioration, but it has a problem that the transparency of the resultant product also deteriorates (for example, see Patent Document 6).

Moreover, a polyester sheet (hereinafter, sometimes referred to as "C-PET sheet") made of a PET resin composition (hereinafter, sometimes referred to as "C-PET") prepared by adding a small amount of a polyolefin resin to PET and a C-PET sheet made of a PET resin composition prepared by blending small amounts of a polyolefin resin and a heat stabilizer or a crystal nucleating agent into PET (for example, see Patent Documents 7 to 10) are excellent in moldability, impact resistance, gas barrier properties and heat resistance, and a container made of a C-PET sheet has been widely used as an inexpensive container for a pressurized heat-treatment.

The above-described C-PET sheet is continuously thermoformed by a heated mold in a vacuum molding machine or the like. At this time, PET oligomers, a polyolefin resin and oligomers thereof and the like gradually stick to and are accumulated on the mold, and as a result thereof, the mold releasability between the heated mold surface and the C-PET sheet deteriorates and the gloss on the inner surface of a container deteriorates, for which a solution has been desired.

CITATION LIST

Patent Document

PTD 1: Patent Publication No. 60-56606
PTD 2: Patent Publication No. 59-6216
PTD 3: Patent Publication No. 59-6216
PTD 4: Japanese Patent Laying-Open No. 3-47830
PTD 5: Japanese Patent Laying-Open No. 3-174441
PTD 6: Japanese Patent Laying-Open No. 2006-282697
PTD 7: Japanese Patent Laying-Open No. 62-227947
PTD 8: Japanese Patent Laying-Open No. 59-62660
PTD 9: Japanese Patent Laying-Open No. 1-121334
PTD 10: Japanese Patent Laying-Open No. 4-345656

SUMMARY OF INVENTION

Technical Problem

The present invention solves the above-mentioned problems of the conventional techniques and enables efficient production of a molded article excellent in transparency and heat-resistant dimensional stability, in particular a heat-resistant blow-molded article. Moreover, the present invention is aimed at providing a polyester resin composition which is excellent in long-term continuous moldability and hardly stains a mold and a molded article prepared therewith, and a method for molding a polyester blow-molded article using the polyester resin composition.

Solution to Problem

As a result of intensive studies in view of solving the above-mentioned problems, the present invention has been completed.

That is, the present invention has the following configuration.

[1] A polyester blow-molded article including a polyester resin composition containing 0.035 to 1.75 equivalent/ton of a hindered phenol structural unit and containing at least one selected from the group consisting of antimony compounds as a polymerization catalyst, the cyclic trimer content thereof being less than or equal to 0.5% by mass, the acetaldehyde content thereof being less than or equal to 50 ppm and the intrinsic viscosity thereof being 0.68 to 0.90 dL/g.

[2] The polyester blow-molded article according to [1], wherein the polyester resin composition is a polyester resin composition not subjected to a deactivation treatment of the polymerization catalyst.

[3] The polyester blow-molded article according to [1] or [2], wherein the hindered phenol structural unit is derived from a hindered phenol compound containing no metal salt structure.

[4] The polyester blow-molded article according to any one of [1] to [3], wherein the thermal oxidative degradation parameter (TOD) of the polyester resin composition is less than or equal to 0.10.

[5] A method for molding a polyester blow-molded article with a cyclic trimer content less than or equal to 0.5% by mass, an acetaldehyde content less than or equal to 50 ppm and an intrinsic viscosity of 0.68 to 0.90 dL/g, including the steps of preparing a polyester resin composition containing 0.035 to 1.75 equivalent/ton of a hindered phenol structural unit and containing at least one selected from the group consisting of antimony compounds as a polymerization catalyst, and performing molding greater than or equal to 10000 times per one mold continuously without cleaning a mold for blow molding.

[6] The method for molding a polyester blow-molded article according to [5], wherein the polyester resin composition is a polyester resin composition not subjected to a deactivation treatment of a polymerization catalyst.

[7] The method for molding a polyester blow-molded article according to [5] or [6], wherein the hindered phenol structural unit is derived from a hindered phenol compound containing no metal salt structure.

Advantageous Effects of Invention

The polyester resin composition according to the present invention is a polyester resin composition which is excellent in long-term continuous moldability at the time of melt molding and is capable of efficiently producing a polyester molded article excellent in transparency and heat-resistant dimensional stability. Furthermore, a molded article obtained from the polyester resin composition is suitably used as a container or packaging material for foods, beverages or the like, in particular a heat-resistant container.

Moreover, a blow-molded article obtained by molding the polyester resin composition according to the present invention into a stretched blow-molded hollow article or a sheet-like object by a molding method such as vacuum molding or pressure molding has an advantage such that the surface glossiness and the transparency are not lowered even at the time of long-term continuous production since surface roughness on the surface of the molded article or the like is hardly generated at the time of heat fixation (heat setting) at a high temperature higher than or equal to 150° C.

DESCRIPTION OF EMBODIMENTS

Hereinafter, embodiments of the heat-resistant polyester blow-molded article according to the present invention and a polyester resin composition constituting the article will be described in detail.

By adding a hindered phenol compound to a polyester resin composition, the polyester resin composition comes to contain a hindered phenol structural unit.

Although there is no particular limitation on the hindered phenol compound used in the present invention as long as the compound has a hindered phenol structure, examples thereof include all of one in which a t-butyl group is located at both sides of the OH group, one in which a t-butyl group is located at one side thereof and a methyl group is located at the other side thereof (semi-hindered phenol), and one in which a t-butyl group is located at one side thereof and a hydrogen atom is located at the other side thereof (less-hindered phenol). Thus, the hindered phenol structural unit refers to a concept that includes all of a phenol structure in which a t-butyl group is located at both sides of the OH group, a phenol structure in which a t-butyl group is located at one side thereof and a methyl group is located at the other side thereof (semi-hindered phenol), and a phenol structure in which a t-butyl group is located at one side thereof and a hydrogen atom is located at the other side thereof (less-hindered phenol). Moreover, as the compounds mentioned below as examples, the t-butyl group may be a bulky group such as an isopropyl group.

Moreover, although a hindered phenol compound may be taken up in the polyester, for example, in the case of adding the hindered phenol compound during the polymerization, such hindered phenol structural parts taken up in the polyester molecular chain are also included therein.

A polyester resin composition containing a hindered phenol structural unit can be obtained by adding a hindered phenol compound to the polyester. The hindered phenol compound may be added at the time of the polymerization of the polyester, or may be added after the polymerization. In the case of adding after the polymerization, a method of preparing a master batch before the addition is preferred. Moreover, it is preferred that a hindered phenol compound which is easy to volatilize at the time of the polymerization be added after the polymerization.

The content (addition amount) of the hindered phenol structural unit in the polyester resin composition is 0.035 to 1.75 equivalent/ton. The lower limit of the content (addition amount) of the hindered phenol structural unit is preferably 0.042 equivalent/ton, more preferably 0.052 equivalent/ton, further preferably 0.07 equivalent/ton, and especially preferably 0.23 equivalent/ton. The upper limit of the content (addition amount) of the hindered phenol structural unit is preferably 0.75 equivalent/ton, and more preferably 0.65 equivalent/ton.

When the content (addition amount) of the hindered phenol structural unit in the polyester resin composition is less than 0.035 equivalent/ton or greater than 1.75 equivalent/ton, it is not preferred because the haze value of the barrel part of the 10000th stretched blow-molded article tends not to be maintained at a value less than or equal to 4.0% at the time of being evaluated by the evaluation method described below (Moldability evaluation method for polyester by means of continuous molding of bottles).

In the case where the hindered phenol compound is easy to volatilize at the time of the polymerization, the compound may be added at the time of the polymerization after the addition amount is predetermined so as to attain the prescribed content by performing a polymerization test in advance and checking the rate at which the compound volatilizes.

Examples of the hindered phenol compound include 2,6-di-tert-butyl-4-methylphenol, 2,6-di-tert-butyl-4-ethylphenol, 2,6-dicyclohexyl-4-methylphenol, 2,6-diisopropyl-4-ethylphenol, 2,6-di-tert-amyl-4-methylphenol, 2,6-di-tert-octyl-4-n-propylphenol, 2,6-dicyclohexyl-4-n-octylphenol, 2-isopropyl-4-methyl-6-tert-butylphenol, 2-tert-butyl-2-ethyl-6-tert-octylphenol, 2-isobutyl-4-ethyl-6-tert-hexylphenol, 2-cyclohexyl-4-n-butyl-6-isopropylphenol, 1,1,1-tris(4-hydroxyphenyl)ethane, 1,1,3-tris(2-methyl-4-hydroxy-5-tert-butylphenyl)butane, triethylene glycol-bis[3-(3-tert-butyl-5-methyl-4-hydroxyphenyl)propionate], 1,6-hexanediol-bis[3-(3,5-di-tert-butyl-4-hydroxyphenyl) propionate], 2,2-thiodiethylene-bis[3-(3,5-di-tert-butyl-4,4-hydroxyphenyl)propionate], N,N'-hexamethylenebis(3,5-di-tert-butyl-4-hydroxy-hydrocinnamide), 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris[(3,5-di-tert-butyl-4-hydroxyphenyl)propionyloxyethyl] isocyanurate, tris(4-tert-butyl-2,6-dimethyl-3-hydroxybenzyl)isocyanurate, 2,4-bis(n-octylthio)-6-(4-hydroxy-3,5-di-tert-butylanilino)-1,3,5-triazine, tetrakis[methylene(3,5-di-tert-butyl-4-hydroxy)hydrocinnamate]methane, bis[(3,3-bis(3-tert-butyl-4-hydroxyphenyl)butylic acid)glycol ester, N,N'-bis[3-(3,5-di-tert-butyl-4-hydroxyphenyl)propionyl]hydrazine, 2,2'-oxamidebis[ethyl-3-(3,5-di-tert-butyl-4-hydroxyphenyl)propionate], bis[2-tert-butyl-4-methyl-6-(3-tert-butyl-5-methyl-2-hydroxybenzyl) phenyl]terephthalate, 1,3,5-trimethyl-2,4,6-tris(3,5-di-tert-butyl-4-hydroxybenzyl)benzene, 3,9-bis[1,1-dimethyl 2-{β-(3-tert-butyl-4-hydroxy-5-methylphenyl) propionyloxy}ethyl]-2,4,8,10-tetraoxaspiro[5,5]undecane, 2,2-bis[4-(2-(3,5-di-tert-butyl-4-hydroxycinnamoyloxy)) ethoxyphenyl]propane, β-(3,5-di-tert-butyl-4-hydroxyphenyl)propionic acid alkyl ester, tetrakis-[methyl-3-(3,5-di-tert-butyl-4-hydroxyphenyl)propionate]methane, octadecyl-3-(3,5-di-tert-butyl-4-hydroxyphenyl)propionate, 1,1,3-tris(2-methyl-4-hydroxy-5-tert-butylphenyl)butane, thiodiethylene-bis[3-(3,5-di-ter-butyl-4-hydroxyphenyl) propionate], ethylenebis(oxyethylene)bis[3-(5-tert-butyl-4-hydroxy-m-tolyl)propionate], hexamethylenebis[3-(3,5-di-tert-butyl-4-hydroxyphenyl)propionate, triethylene glycol-bis-[3-(3'-tert-butyl-4-hydroxy-5-methylphenyl)] propionate, and 1,1,3-tris[2-methyl-4-(3-(3,5-di-tert-butyl-4-hydroxyphenyl)propionyloxy]-5-tert-butylphenyl]butane. These may be simultaneously used in combination of two or more thereof. Of these, 1,3,5-trimethyl-2,4,6-tris(3,5-di-tert-butyl-4-hydroxybenzyl)benzene, tetrakis-[methyl-3-(3,5-di-tert-butyl-4-hydroxyphenyl)propionate]methane, and thiodiethylene-bis[3-(3,5-di-tert-butyl-4-hydroxyphenyl) propionate] are preferred. These compounds are commercially available as Irganox (R). Of these, preferred is one having a vapor pressure at 20° C. less than or equal to $1.0 \times 10^{-5}$ Pa, further preferred is one having a vapor pressure at 20° C. less than or equal to $1.0 \times 10^{-6}$ Pa, and especially preferred is one having a vapor pressure at 20° C. less than or equal to $1.0 \times 10^{-1}$ Pa, for reducing the volatilization at the time of molding. Moreover, in the case where the compound is added at the time of the polymerization, it is preferred that the compound have a vapor pressure at 20° C. less than or equal to $1.0 \times 10^{-10}$ Pa for preventing the distillation in the polycondensation.

Although the above-mentioned compounds can be used as the hindered phenol compounds, in the present invention, it is preferred that the hindered phenol structural unit be derived from a hindered phenol compound containing no metal salt structure. In the case of using a hindered phenol compound containing a metal salt structure, the transparency of the resulting polyester blow-molded article may deteriorate.

At the time of continuously producing bottles (blow-molded articles) from a polyester resin composition, although the details of the mechanism of deterioration of the bottle haze have not yet been elucidated, it is presumed that the bottle haze deteriorates since decomposition products (oligomers) in the polyester stick to the mold surface by heat generated in the blow molding machine, after which cyclic trimers in the polyester precipitate and further stick thereto.

By allowing the polyester composition to contain the hindered phenol structure within the above-mentioned range, since polyester decomposition products caused by heat generated at the time of melting or generated in the blow molding machine are effectively suppressed and decomposition products of the polyester which play a role of an adhesive are inhibited, the amount of cyclic trimers stuck is reduced even when cyclic trimers precipitate, and it is possible to prevent the reduction in bottle haze at the time of continuously producing bottles.

In the case where the hindered phenol is not contained, it is considered that the amount of precipitated cyclic trimers stuck increases and the bottle haze deteriorates since decomposition products of the polyester which play a role of an adhesive are increased.

It is surprising that adding the hindered phenol in an amount within a range of the addition amount smaller than the conventional addition amount of the hindered phenol usually used creates an effect of maintaining the haze value of the barrel part of the 5000th and even 10000th stretched blow-molded articles at a value less than or equal to 4.0% at the time of being evaluated by the evaluation method described below (Moldability evaluation method for polyester by means of continuous molding of bottles).

When the content (addition amount) of the hindered phenol structural unit is greater than 1.75 equivalent/ton, there is a tendency for the bottle haze at the time of continuously producing bottles to be lowered. Although the details of the mechanism of deterioration of the bottle haze have not yet been elucidated, it is presumed that this is because the hindered phenol bleeds out and sticks to the mold surface.

As described above, the present inventors ascertained that the cause of the deterioration in bottle haze is the formation of polyester decomposition products rather than the increase of cyclic trimers, and have found that the hindered phenol in an amount within a specific range is effective in suppressing the formation of polyester decomposition products. This is an important point in the present invention.

By using a hindered phenol compound containing no metal salt structure, it is possible to maintain the haze value of the barrel part of the 5000th and even 10000th stretched blow-molded articles at a value less than or equal to 3.0% at the time of being evaluated by the above-mentioned evaluation method.

The polyester in a polyester resin composition is preferably a polyester whose main repeating unit is ethylene terephthalate, more preferably a linear polyester containing an ethylene terephthalate unit in a content greater than or equal to 85% by mole, further preferably a linear polyester containing the unit in a content greater than or equal to 90% by mole, and especially preferably a linear polyester containing the unit in a content greater than or equal to 95% by mole.

As a dicarboxylic acid as a copolymerization component used in the case where the polyester is a copolymer, aromatic dicarboxylic acids such as isophthalic acid, orthophthalic acid, 2,6-naphthalenedicarboxylic acid, 1,3-naphthalenedicarboxylic acid, 1,4-naphthalenedicarboxylic acid, 1,5-naphthalenedicarboxylic acid, 2,7-naphthalenedicarboxylic acid, diphenyl-4,4-dicarboxylic acid, 4,4'-biphenyletherdicarboxylic acid, 1,2-bis(phenoxy)ethane-p,p'-dicarboxylic acid and anthracenedicarboxylic acid; aliphatic dicarboxylic acids and alicyclic dicarboxylic acids, examples of which include oxalic acid, malonic acid, succinic acid, glutaric acid, adipic acid, pimelic acid, suberic acid, azelaic acid, sebacic acid, decane dicarboxylic acid, dodecane dicarboxylic acid, tetradecane dicarboxylic acid, hexadecane dicarboxylic acid, 1,3-cyclobutane dicarboxylic acid, 1,3-cyclopentane dicarboxylic acid, 1,2-cyclohexane dicarboxylic acid, 1,3-cyclohexane dicarboxylic acid, 1,4-cyclohexane dicarboxylic acid, 2,5-norbornane dicarboxylic acid, a dimer acid and a hydrogenated dimer acid; and unsaturated dicarboxylic acids such as fumaric acid and itaconic acid can be used.

Moreover, a hydroxy carboxylic acid may be used in combination therewith. Examples of the hydroxy carboxylic acid include lactic acid, citric acid, malic acid, tartaric acid, hydroxyacetic acid, 3-hydroxybutylic acid, p-hydroxybenzoic acid, p-(2-hydroxyethoxy)benzoic acid, 4-hydroxycyclohexanecarboxylic acid, and an ester-forming derivative thereof.

Moreover, combined use of a cyclic ester therewith is also acceptable. Examples of the cyclic ester include ε-caprolactone, β-propiolactone, β-methyl-β-propiolactone, δ-valerolactone, glycolide, and lactide.

These copolymerization components such as a dicarboxylic acid and a hydroxy carboxylic acid can be used preferably within a range of 0 to 15% by mole, and more preferably within a range of 0 to 5% by mole, in the carboxylic acid component.

Examples of a glycol as a copolymerization component used in the case where the polyester is a copolymer include aliphatic glycols such as diethylene glycol, propylene glycol, 1,3-propanediol, 1,4-butylene glycol, 1,2-butylene glycol, 1,3-butylene glycol, 2,3-butylene glycol, 1,5-pentanediol, 1,6-hexanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, 3-methyl-1,5-pentanediol, 2-methyl-1,5-pentanediol, 2-methyl-1,3-propanediol, 2-ethyl-1,3-propanediol, neopentyl glycol, 2-ethyl-2-methyl-1,3-propanediol, 2,2-diethyl-1,3-propanediol, 2-methyl-2-n-butyl-1,3-propanediol, 2-n-butyl-2-ethyl-1,3-propanediol, 2,2-di-n-butyl-1,3-propanediol, 2-ethyl-2-n-hexyl-1,3-propanediol, 2,2-di-n-hexyl-1,3-propanediol, 1,9-nonanediol, 1,10-decanediol, 1,12-dodecanediol, diethylene glycol, triethylene glycol, polyethylene glycol, polytrimethylene glycol, polytetramethylene glycol and polypropylene glycol; and aromatic glycols such as hydroquinone, 4,4'-dihydroxy bisphenol, 1,4-bis(β-hydroxyethoxy)benzene, 1,4-bis(β-hydroxyethoxyphenyl)sulfone, bis(p-hydroxyphenyl)ether, bis (p-hydroxyphenyl)sulfone, bis(p-hydroxyphenyl)methane, 1,2-bis(p-hydroxyphenyl)ethane, bisphenol A and an alkylene oxide adduct of bisphenol A. These copolymerization components such as a diglycol can be used preferably within a range of 0 to 15% by mole, and more preferably within a range of 0 to 5% by mole, in the diol component.

Furthermore, examples of a polycarboxylic acid having functionalities greater than or equal to 3 as a copolymerization component used in the case where the polyester is a copolymer include trimellitic acid, pyromellitic acid, methylcyclohexene tricarboxylic acid, oxydiphthalic acid dianhydride (ODPA), 3,3',4,4'-benzophenonetetracarboxylic acid dianhydride (BTDA), 3,3',4,4' biphenyltetracarboxylic acid dianhydride (BPDA), 3,3',4,4'-diphenylsulfonetetracarboxylic acid dianhydride (DSDA), 4,4'-(hexafluoroisopropylidene)diphthalic acid dianhydride (6FDA), and 2,2'-bis[(dicarboxyphenoxy)phenyl]propane dianhydride (BSAA). Moreover, examples of a polyol having functionalities greater than or equal to 3 as a copolymerization component used in the case where the polyester is a copolymer include glycerin, pentaerythritol, trimethylolethane, trimethylolpentane and trimethylolpropane. One or more kinds thereof can be selected from among them for use.

Moreover, it is possible to add a known phosphorus compound as a copolymerization component to the polyester. As a phosphorus-based compound, a bifunctional phosphorus-based compound is preferred, and examples thereof include (2-carboxylethyl)methylphosphinic acid, (2-carboxyethyl) phenylphosphinic acid, and 9,10-dihydro-10-oxa-(2,3-carboxypropyl)-10-phosphaphenanthrene-10-oxide. By adding these phosphorus-based compounds as copolymerization components to the polyester, it is possible to enhance the flame retardance of the resulting polyester.

Hereinafter, the polyester resin composition of the present invention will be described. Since the quantity of either of a hindered phenol structural unit and catalyst components which are components other than the above-mentioned polyester is minute, the polyester containing these components is sometimes abbreviated as "polyester" for convenience.

The above-mentioned polyester can be produced by a conventionally known production method. That is, in the case of PET, the polyester is produced by a direct esterification method of directly reacting terephthalic acid, ethylene glycol and optional other copolymerization components with one another, distilling off water, and polycondensing a low-order condensate obtained by esterification under reduced pressure in the presence of a polymerization catalyst, or a transesterification method of reacting dimethyl terephthalate, ethylene glycol and optional other copolymerization components with one another in the presence of a transesterification catalyst, distilling off methyl alcohol, and polycondensing a low-order condensate obtained by transesterification under reduced pressure in the presence of a polymerization catalyst. Furthermore, as necessary, solid phase polymerization may be performed in order to increase the intrinsic viscosity and lower the acetaldehyde content, the cyclic trimer content and the like. For promoting the crystallization before solid phase polymerization, the polyester obtained by the melt polymerization may be allowed to absorb moisture and then may be crystallized by heating, and moreover, water vapor may be sprayed directly onto polyester chips and the polyester chips may be crystallized by heating.

The melt polycondensation reaction may be performed in a batch processing reaction apparatus or may be performed in a continuous processing reaction apparatus. In either of these processes, the melt polycondensation reaction may be performed in a single-step process or the reaction may be divided into multiple steps. As with the melt polycondensation reaction, the solid phase polymerization reaction can be performed in a batch processing apparatus or a continuous processing apparatus. The melt polycondensation and the solid phase polymerization may be consecutively performed or may be dividedly performed.

Moreover, in the case of adding a small amount of a tertiary amine such as triethylamine, tri-n-butylamine or benzyldimethylamine, a quaternary ammonium hydroxide such as tetraethylammonium hydroxide, tetra-n-butylammonium hydroxide or trimethylbenzylammonium hydroxide, and a basic compound such as lithium carbonate, sodium carbonate, potassium carbonate or sodium acetate and performing the reaction, it is preferred because the proportion of the dioxyethylene terephthalate component unit in the main chain of the polyethylene terephthalate can be maintained at a relatively low level (a proportion less than or equal to 5% by mole relative to the whole diol component).

For example, the above-mentioned polyester can be produced in the following manner, but the production method is not limited thereto. In the case of preparing the polyester by polymerization, the polyester can be produced using at least one selected from antimony compounds as a polymerization catalyst.

Examples of the antimony compound include antimony trioxide, antimony acetate, antimony tartrate, antimony potassium tartrate, antimony oxychloride, antimony glycolate, antimony pentoxide, and triphenyl antimony.

These antimony compounds contain antimony preferably in an amount of 50 to 400 ppm, further preferably in an amount of 100 to 350 ppm, and especially preferably in an amount of 150 to 300 ppm, in terms of the mass of the residual antimony relative to the mass of the polyester produced.

In the present invention, it does not matter if only the antimony compound is used as the polymerization catalyst used at the time of preparing the polyester by polymerization, but other metal compounds such as a germanium compound, a titanium compound, a tin compound and an aluminum compound may be used in combination therewith. In this case, the metal used as the polymerization catalyst contains antimony preferably in a content greater than or equal to 60% by mole, more preferably in a content greater than or equal to 70% by mole, further preferably in a content greater than or equal to 80% by mole, and especially preferably in a content greater than or equal to 90% by mole.

It is preferred that the thermal oxidative degradation parameter (TOD) of the polyester resin composition of the present invention be less than or equal to 0.10. The TOD can be calculated by a method described in the item of Examples mentioned below. A TOD of less than or equal to 0.10 can be accomplished by allowing the polyester resin composition to have the foregoing configuration. The TOD is preferably less than or equal to 0.09, further preferably less than or equal to 0.07, and most preferably less than or equal to 0.05. When the TOD is greater than 0.10, it is not preferred because the haze value of the barrel part of the 10000th stretched blow-molded article tends not to be maintained at a value less than or equal to 4.0% at the time of being evaluated by the evaluation method described below (Moldability evaluation method for polyester by means of continuous molding of bottles).

The polymerization catalyst used in the present invention can be added to the reaction system at an arbitrary stage of the polycondensation reaction. For example, the catalyst can be added to the reaction system at an arbitrary stage prior to the onset of an esterification reaction or a transesterification reaction and at an arbitrary stage during the course of the reaction, or at an arbitrary stage immediately prior to the onset of a polycondensation reaction or during the course of the polycondensation reaction.

With regard to the method for adding a polymerization catalyst used in the present invention, the catalyst in powder form or in neat form may be added and the catalyst in slurry form or in solution form prepared with glycols such as ethylene glycol may be added, and the method is not particularly limited.

The intrinsic viscosity of the polyester mentioned above preferably lies within the range of 0.68 to 1.20 dL/g, more preferably lies within the range of 0.68 to 1.00 dL/g, further preferably lies within the range of 0.68 to 0.90 dL/g, and most preferably lies within the range of 0.68 to 0.80 dL/g. When the intrinsic viscosity is less than 0.68 dL/g, mechanical characteristics of the resultant molded article or the like are unsatisfactory. Moreover, when the intrinsic viscosity is greater than 1.20 dL/g, there occur problems such that the amount of the liberated low molecular weight compounds which affect the aroma retaining property is increased, the molded article is colored in yellow, and the like since the resin temperature is heightened at the time of being molten with a molding machine or the like and the polyester is thermally decomposed vigorously.

In this connection, even in the case where an object to be actually measured is a polyester resin composition, the viscosity is expressed as "intrinsic viscosity of the polyester."

Moreover, the amount of diethylene glycol copolymerized into the polyester mentioned above is preferably 0.5 to 7.0% by mole, more preferably 1.0 to 5.0% by mole, and further preferably 1.5 to 4.0% by mole, in the glycol component constituting the polyester. In the case where the amount of diethylene glycol is greater than 7.0% by mole, it is not preferred because the thermal stability is unsatisfactory, the reduction in molecular weight is significant at the time of molding, and moreover, the increment of the acetaldehyde content or the formaldehyde content is large. Moreover, in the case where the diethylene glycol content is less than 0.5% by mole, the transparency of the resultant molded article is unsatisfactory.

Moreover, the content of the cyclic trimer in the polyester resin composition is preferably less than or equal to 0.50% by mass, more preferably less than or equal to 0.40% by mass, and further preferably less than or equal to 0.35% by mass. When molding a heat-resistant blow-molded article and the like from the polyester resin composition in the present invention, in the case where the content of the cyclic trimer is greater than 0.50% by mass, the amount of oligomers stuck to the heated mold surface is rapidly increased and the transparency of the resultant blow-molded article or the like considerably deteriorates. Moreover, it is preferred that the lower limit be 0.20% by mass from an aspect of production.

In order to reduce the content of the cyclic trimer in the polyester resin composition, the solid phase polymerization is effective as described above. By setting the conditions for the solid phase polymerization appropriately, it is possible to reduce the cyclic trimer.

Moreover, it is desirable that the content (in terms of mass) of aldehydes such as acetaldehyde in the polyester resin composition be preferably less than or equal to 30 ppm, and more preferably less than or equal to 10 ppm. In the case where the aldehydes content is greater than 30 ppm, the effect of flavor retaining property for the contents contained in a molded article or the like molded from this polyester resin composition is impaired. Moreover, it is preferred that the lower limit thereof be 0.1 ppb from an aspect of production. In this context, examples of the aldehydes include acetaldehyde and formaldehyde. In the case of copolymerizing glycols other than ethylene glycol, examples thereof include aldehydes respectively corresponding to each of glycols, and for example, allyl aldehyde can also be mentioned in the case of copolymerizing 1,3-propylene glycol.

Moreover, the polyester resin composition mentioned above may be subjected to a contact treatment with water, water vapor or a water vapor-containing gas, and a phosphorus compound and the like may be added to the polyester resin composition. Although it is possible to deactivate the polymerization catalyst by such contact treatment and addition of a phosphorus compound, in the present invention, by using a polyester resin composition not subjected to such a deactivation treatment of the polymerization catalyst, it is possible to mold a polyester blow-molded article having a cyclic trimer content less than or equal to 0.5% by mass, an acetaldehyde content less than or equal to 50 ppm and an intrinsic viscosity of 0.68 to 0.90 dL/g greater than or equal to 10000 times per one mold continuously without cleaning the mold for blow molding. As described above, this is because the generation of polyester decomposition products which cause the deterioration of the bottle haze is effectively suppressed by adding the hindered phenol in an amount which lies within a specific range.

For continuously molding the polyester blow-molded article without cleaning the mold, lowering the content of the cyclic trimer in the polyester resin composition and furthermore lowering the content of the cyclic trimer in the blow-molded article by deactivating the polymerization catalyst is a preferred embodiment, but the process for lowering the cyclic trimer content by solid phase polymerization, the process for catalyst deactivation and the like increase production costs. In the present invention, since it is possible to continuously mold a blow-molded article having a larger cyclic trimer content plural times similarly to the case where a blow-molded article having a conventional cyclic trimer content of about 0.3% by mass and having been subjected to catalyst deactivation is continuously molded while suppressing these process costs, this is also a preferred embodiment.

As a preferred embodiment in this case, the content of the cyclic trimer in the blow-molded article is preferably greater than 0.33% by mass, further preferably greater than or equal to 0.35% by mass, and especially preferably greater than or equal to 0.37% by mass.

Even when the content of the cyclic trimer in the polyester resin composition as the raw material is less than or equal to 0.3% by mass, in the case where the polyester resin composition is not subjected to catalyst deactivation, the content of the cyclic trimer in the blow-molded article is usually greater than 0.33% by mass.

In the case where the catalyst is not deactivated, the increment of the cyclic trimer when the polyester resin composition is molten at a temperature of 290° C. for 60 minutes exceeds 0.25% by mass, and furthermore, the increment thereof exceeds 0.3% by mass, the increment thereof sometimes exceeds 0.4% by mass, and furthermore, the increment thereof exceeds 0.5% by mass. In this connection, the increment of the cyclic trimer is affected by the content of the cyclic trimer before melting. That is, when the amount of the cyclic trimer before melting is small, the increment thereof is large. Moreover, the increment of the cyclic trimer is also affected by the content of the catalyst. That is, when the amount of the catalyst is small and the polymerization activity is low, the increment thereof is small. Although the upper limit of the increment of the cyclic trimer varies depending upon the content of the cyclic trimer before melting, the upper limit thereof is about 0.8% by mass.

Moreover, into the polyester resin composition of the present invention, additives such as various resins for improving the crystallization characteristics, an aldehyde reducing agent, a color tone improving agent and an infrared ray absorber may be blended. The amount thereof blended is preferably less than or equal to 1% by mass in total in the polyester resin composition.

However, the amount of the resins other than the polyester among these additives blended is preferably less than 0.05% by mass, further preferably less than or equal to 0.03% by mass, and especially preferably less than or equal to 0.01% by mass. When the amount is greater than 0.05% by mass, the mold is sometimes contaminated and the haze value of the bottle is sometimes lowered.

Moreover, the polyester resin composition of the present invention, which is in a molten state after the melt polycondensation process is ended in the above-described manner or is in a state of being formed into a chip shape after the treatment such as the solid phase polymerization is ended, may be directly subjected to the molding process to be formed into a molded article. Moreover, a prescribed amount of additives such as a crystallization characteristics improving agent, an aldehyde reducing agent, a coloring modifier and a stabilizer may be added into any reactor or transport piping used in the production process of the melt polycondensation polymer, and the polyester resin composition may be subjected to melt polycondensation so as to have desired characteristics, after which the condensate as it is or after being subjected to a treatment such as the solid phase polymerization may be directly subjected to the molding process to be formed into a molded article.

For producing a blow-molded article, it is common to employ a method for subjecting a preform molded from the polyester resin composition of the present invention to stretch blow molding or then subjecting the blow-molded product to heat fixation.

Moreover, the polyester resin composition of the present invention can be used for the production of a stretched blow-molded article by a method of subjecting a perform, which is obtained by subjecting a molten lump prepared by melt-extruding the polyester resin composition and cut the composition into pieces to compression molding, to stretch blow molding, a so-called compression molding method.

Specifically, for example, a preform is once molded by injection molding or extrusion molding, the preform as it is or after being processed in the cap part or the bottom part thereof is reheated, and a biaxial stretch blow molding method such as a hot parison method or a cold parison method is applied. Moreover, a heat-resistant blow-molded article can be molded by subjecting the preform to biaxial stretch blow molding by a one-step molding method or a two-step molding method and then subjecting the molded product to heat fixation.

The molding temperature at the time of producing a heat-resistant stretched blow molded article, specifically, temperatures of each part of the cylinder and the nozzle of the molding machine usually lie within the range of 260 to 290° °. The stretching needs only to be performed usually at a stretching temperature of 70 to 120° C., preferably 80 to 110° C., and usually at a stretch ratio in the vertical direction within the range of 1.5 to 3.5 times and a stretch ratio in the circumferential direction within the range of 2 to 5 times. Although the resultant blow-molded article can be used directly, especially in the case of a blow-molded article for beverages requiring hot filling such as a fruit juice beverage and oolong tea, in general, the blow-molded article is further subjected to heat fixation in a blow mold and imparted with heat resistance before use. The heat fixation is performed for a few seconds to a few hours, preferably for a few seconds to a few minutes, at 100 to 200° C., preferably at 120 to 180° C., usually under tension caused by compressed air and the like.

It is important that the barrel part of the blow-molded article be subjected to heat fixation so that the degree of crystallinity by densimetry becomes greater than or equal to 20%, preferably greater than or equal to 30%, and especially preferably greater than or equal to 33%. This enables the heat resistance of the molded article to be significantly enhanced, and thermal deformation and thermal contraction which are caused in the case where a molded article is hot-filled with the contents or the filled molded article is subjected to pasteurizer sterilizing can be improved.

By using the polyester resin composition obtained as above, it is possible to obtain a heat-resistant polyester blow-molded article having a cyclic trimer content less than or equal to 0.5% by mass, an acetaldehyde content less than or equal to 50 ppm and an intrinsic viscosity of 0.68 to 0.90 dL/g. The intrinsic viscosity of the heat-resistant polyester blow-molded article is preferably 0.70 to 0.88 dL/g, more preferably 0.73 to 0.85 dL/g and further preferably 0.74 to 0.84 dL/g. The acetaldehyde content of the heat-resistant polyester blow-molded article is preferably less than or equal to 20 ppm and more preferably less than or equal to 10 ppm.

Moreover, by using the polyester resin composition obtained as above, it becomes possible to mold polyester blow-molded articles having a cyclic trimer content less than or equal to 0.5% by mass, an acetaldehyde content less than or equal to 50 ppm and an intrinsic viscosity of 0.68 to 0.90 dug greater than or equal to 10000 times per one mold continuously without cleaning the mold for blow molding.

As the criterion for deciding whether the polyester blow-molded article can be molded continuously without cleaning the mold for blow molding or not, in the case where the haze value of the resulting bottle barrel part is maintained at a value less than or equal to 4.0%, it can be said that the polyester blow-molded article satisfies the criterion. More preferably, in the case where the haze value of the bottle barrel part is maintained at a value less than or equal to 3.5%, an increase in the number of times for molding during the period until the mold for blow molding is cleaned can be expected. Further preferably, in the case where the haze value of the bottle barrel part is maintained at a value less than or equal to 3.0%, a further increase in the number of times for molding during the period until the mold for blow molding is cleaned can be expected.

EXAMPLES

Hereinafter, the present invention will be described in more detail by reference to examples, but the present invention is not limited to these examples. In this connection, a method for measuring the main characteristic values will be described below. Unless otherwise specified, "ppm" is calculated on the basis of the mass.

(1) Intrinsic Viscosity (IV)

The intrinsic viscosity was determined from the solution viscosity at 30° C. of a polyester resin composition in a 1,1,2,2-tetrachloroethane/phenol (2:3 mass ratio) mixed solvent.

(2) Quantitation Method of Catalyst Metal

Inside a stainless steel-made circular ring with a thickness of 5 mm and an inner diameter of 50 mm, a polyester resin composition was placed and molten by heating to a temperature of the melting point+20° C. to prepare a sample piece, and the element content was determined by X-ray fluorescence analysis and expressed in terms of ppm. In this connection, at the time of the determination of the content, a calibration curve previously obtained from a sample in which each element content had been known was used.

(3) Content of Cyclic Trimer (Hereinafter Referred to as "CT Content")

A sample was dissolved in a hexafluoroisopropanol/chloroform mixed liquid, and chloroform was further added to the mixture for dilution. To this, methanol was added to precipitate the polymer, after which the precipitate was filtered. The filtrate was evaporated to dryness and made up to a prescribed volume with dimethylformamide, and the cyclic trimer composed of an ethylene terephthalate unit was quantitatively analyzed by liquid chromatography.

(4) Acetaldehyde Content (Hereinafter Referred to as "AA Content")

In a glass ampule, the inner atmosphere of which had been replaced with nitrogen, a sample and distilled water of sample/distilled water=1 g/2 cc were placed, the top of the glass ampule was molten and sealed, an extraction treatment was performed for 2 hours at 160° C., and after cooling, the extraction liquid was measured for acetaldehyde by high-sensitivity gas chromatography and the concentration was expressed in terms of ppm.

(5) Moldability Evaluation Method for Polyester by Means of Continuous Molding of Bottles A sample polyester resin composition was dried with a vacuum dryer to set the moisture content to be less than or equal to 100 ppm, and injection-molded at a preset temperature of 260 to 270° C. using a 150C-DM type injection molding machine available from MEIKI CO., LTD. and a mold for preform (mold temperature 5° C.) and at an injection pressure of 2.35 MPa to obtain 28 g of a bottomed preform (PF).

The cap part of the bottomed preform (PF) was crystallized by heating with a home-made apparatus for crystallizing a cap part.

Then, using a SBO Lab N° 1045 type 1Lab blow molding machine available from Sidel Japan K.K., while air with a pressure of 36 bar was blown into a mold, the temperature of which was set to 160° C., the preform was biaxially stretched and blow-molded by 2.5 times in the vertical direction and by 3.8 times in the circumferential direction in a molding cycle of 30 seconds and at a rate of 750 bph, and subsequently, subjected to heat fixation for 2.3 seconds in the mold to continuously mold 10000 stretched blow-molded articles (bottles) with a capacity of 500 cc.

Samples obtained from the barrel parts of the 5000th and 10000th bottles were subjected to the haze measurement.

Moreover, with these bottles, each measurement was performed. In the case where the amount of the measurement sample was not enough, the sample was supplemented with a bottle molded before or after each of those bottles.

(6) Haze of Bottle (Haze Degree %)

A sample of the barrel part was cut off from the bottle (barrel part wall thickness 0.3 mm) obtained as above, and measured for the haze with a haze meter, model NDH2000 available from NIPPON DENSHOKU INDUSTRIES CO., LTD.

(7) Degree of Crystallinity of Molded Article

The density of a sample was determined under the condition of 30° C. with a density gradient tube containing a calcium nitrate/water mixed solution. From this, the degree of crystallinity was calculated according to the following equation.

$$\text{Degree of crystallinity}(X_c) = (\rho_c/\rho) \times \{(\rho - \rho_{am})/(\rho_c - \rho_{am})\} \times 100$$

$\rho$: Measured density (g/cm$^3$)
$\rho_{am}$: Amorphous density (1.335 g/cm$^3$)
$\rho_c$: Crystal density (1.455 g/cm$^3$)

(8) Filling Test at the Time of Heating Bottle

A bottle was filled with hot water of 95° C., capped with a cap using a capping machine, and then allowed to lie on its side and stand still, after which the leakage of the contents was checked. Moreover, the deformation state of the barrel part was visually observed and evaluated according to the following criteria.

○: There is almost no deformation of the barrel part.
Δ: There is a little deformation of the barrel part.
x: There is a significant deformation of the barrel part.

(9) Thermal Oxidative Degradation Parameter (TOD)

A blow-molded article was cut into pieces with a pair of nippers and the pieces were frozen and pulverized to prepare a powder passing through a 20 mesh sieve. This powder was dried under vacuum for 12 hours at 130° C., and 300 mg of the powder was placed in a glass test tube with an inner diameter of about 8 mm and a length of about 140 mm and dried under vacuum for 12 hours at 70° C. Then, under an air atmosphere having been dried by allowing the test tube to be topped with a drying tube containing silica gel, $[IV]_{f1}$ obtained after the powder was heated for 15 minutes by immersing the test tube in a salt bath of 230° C. was measured. The TOD was determined as described below. In the equation, $[IV]_i$ and $[IV]_{f1}$ refer to Vs (dl/g) obtained before the heating test and after the heating test, respectively. The freeze pulverization was performed using a freezer mill (available from U.S. SPEX, 6750 type). In a dedicated cell, about 2 g of resin chips or pieces of a film and a dedicated impactor were placed, after which the cell was set to an apparatus, the apparatus was filled with liquid nitrogen, the cell was held in place for about 10 minutes, and then the pulverization was performed for 5 minutes at the RATE 10 (the impactor is allowed to move back and forth about 20 times per second).

$$TOD = 0.245\{[IV]_{f1}^{-1.47} - [IV]_i^{-1.47}\}$$

(10) Increment of Cyclic Trimer (ΔCT)

In a glass-made test tube, 3 g of a sample was placed, and the test tube was immersed in an oil bath of 290° C. for 60 minutes under a nitrogen atmosphere to melt the sample. The above-mentioned CT content was measured before and after melting, and the increment thereof was calculated.

Preparation examples of a polymerization catalyst and the like used in examples are shown below.

(Ethylene Glycol Solution of Hindered Phenol Compound [1])

Into a flask, Irganox 1010 (available from Ciba Specialty Chemicals Inc.: tetrakis-[methyl-3-(3,5-di-tert-butyl-4-hydroxyphenyl)propionate]methane) was placed together with ethylene glycol, the contents were heated for 12 hours at a liquid temperature of 50° C. with stirring while nitrogen gas was sufficiently blown into the flask to prepare an ethylene glycol solution of the hindered phenol compound with a concentration of 30 g/L.

(Ethylene Glycol Solution of Hindered Phenol Compound [2])

Into a flask, Irganox 1425 (available from Ciba Specialty Chemicals Inc.: calcium-bis[3,5-di-tert-butyl-4-hydroxybenzyl(ethoxy)phosphinate]) was placed together with ethylene glycol, the contents were heated for 12 hours at a liquid temperature of 50° C. with stirring while nitrogen gas was sufficiently blown into the flask to prepare an ethylene glycol solution of the hindered phenol compound with a concentration of 30 g/L.

(Ethylene Glycol Solution of Antimony Compound)

A solution obtained by heating and dissolving antimony trioxide in ethylene glycol was prepared.

Example 1

High-purity terephthalic acid and twice its amount by mole of ethylene glycol were placed, triethylamine was added so that the content thereof became 0.3% by mole relative to the acid component, and an esterification reaction was performed at 250° C. under an elevated pressure of 0.25 MPa while water was distilled off and removed to the outside of the system to obtain a mixture of bis(2-hydroxyethyl)terephthalate with an esterification rate of about 95% and oligomers (hereinafter referred to as BHET mixture). To this BHET mixture, as a polymerization catalyst, an ethylene glycol solution of the above-mentioned antimony compound was added so that the remaining amount of antimony atoms became 280 ppm relative to the mass of the resultant polyester, and then, under a nitrogen atmosphere and normal pressure, the ethylene glycol solution of hindered phenol compound [1] was added so that the amount of the hindered phenol compound became 100 ppm relative to the mass of the polyester (amount of hindered phenol structural unit of 0.34 equivalent/ton). The contents were stirred for 10 minutes at 250° C. Afterward, the pressure of the reaction system was gradually reduced to 13.3 Pa (0.1 Torr) while the temperature was raised to 280° C. over a period of 60 minutes, and furthermore, a polycondensation reaction was performed at 13.3 Pa. Subsequent to the pressure release, the resin under a slightly positive pressure was discharged in a strand shape into water and allowed to cool, after which the resin was cut into pieces with a cutter to obtain pellets of a cylindrical shape with a 1.5 length of about 3 mm and a diameter of about 2 mm. The IV of the resultant PET resin composition was determined to be 0.58 dl/g. The pellets obtained by the melt polymerization were dried under reduced pressure (pressure less than or equal to 13.3 Pa, 80° C., 12 hours), after which the pellets were subsequently subjected to a crystallization treatment (pressure less than or equal to 13.3 Pa, 130° C., 3 hours, and then, pressure less than or equal to 13.3 Pa, 160° C., 3 hours). The polyester pellets after allowed to lose heat were subjected to solid phase polymerization in a solid phase polymerization reactor while maintaining the pressure and temperature in the system under a pressure less than or equal to 13.3 Pa and at 215° C. to obtain a PET resin composition with an IV of 0.78 dl/g.

Then, each evaluation was performed.

There was no problem because the transparency of the bottomed preform (PF) described in the above-mentioned (5) was satisfactory (0) when visually observed, and furthermore, the haze value of the bottle barrel part of the 5000th bottle prepared by bottle continuous molding was 1.8%. Furthermore, there was no problem because a satisfactory haze value of the bottle barrel part of the 10000th bottle of 2.0% was attained, sufficient crystallization with a degree of crystallinity of 35% was attained, the bottle had no leakage in the heating and filling test, and moreover, the bottle had no deformation of the barrel part. The results are shown in Table 1.

Examples 2 to 4

A PET resin composition was obtained in the same manner as that in Example 1 except that the amount of the hindered phenol compound [1] was changed to those listed in Table 1. The transparency of the bottomed preform (PF) described in the above-mentioned (5) was satisfactory (○) when visually observed, both haze values of the bottle barrel parts of the 5000th and 10000th bottles prepared by continuous molding were satisfactory, and there was no problem in other evaluations. The results are shown in Table 1.

Comparative Example 1

A PET resin composition was obtained in the same manner as that in Example 1 except that no hindered phenol compound [1] was added.

The transparency of the bottomed preform (PF) described in the above-mentioned (5) was satisfactory (○) when visually observed, and the haze value of the bottle barrel part of the 5000th bottle prepared by bottle continuous molding was 1.8%. However, there was a problem that an unsatisfactory haze value of the bottle barrel part of the 10000th bottle of 4.8% was attained. These results suggest that it is impossible to mold a polyester blow-molded article greater than or equal to 10000 times per one mold continuously without cleaning the mold for blow molding. The results are shown in Table 2.

Comparative Example 2

A PET resin composition was obtained in the same manner as that in Example 1 except that the amount of the hindered phenol compound [1] was changed to that listed in Table 2.

The transparency of the bottomed preform (PF) described in the above-mentioned (5) was satisfactory (○) when visually observed, and the haze value of the bottle barrel part of the 5000th bottle prepared by bottle continuous molding was 1.8%. However, there was a problem that an unsatisfactory haze value of the bottle barrel part of the 10000th bottle of 4.1% was attained. These results suggest that it is impossible to mold a polyester blow-molded article greater than or equal to 10000 times per one mold continuously without cleaning the mold for blow molding. The results are shown in Table 2.

Comparative Example 3

A PET resin composition was obtained in the same manner as that in Example 1 except that the solid phase polymerization temperature was changed to 202° C. A PET resin composition with an IV of 0.78 dl/g and a cyclic trimer content of 7200 ppm was obtained.

The transparency of the bottomed preform (PF) described in the above-mentioned (5) was somewhat unsatisfactory (Δ) when visually observed, and the haze value of the bottle barrel part of the 5000th bottle prepared by bottle continuous molding was 2.0%. However, there was a problem that an unsatisfactory haze value of the bottle barrel part of the 10000th bottle of 4.6% was attained. These results suggest that it is impossible to mold a polyester blow-molded article greater than or equal to 10000 times per one mold continuously without cleaning the mold for blow molding. The results are shown in Table 2.

Example 5

A PET resin composition was obtained in the same manner as that in Example 1 except that, in place of the ethylene glycol solution of hindered phenol compound [1], the ethylene glycol solution of hindered phenol compound [2] was added so that the amount of the hindered phenol compound became 150 ppm relative to the mass of the polyester (amount of hindered phenol structural unit of 0.43 equivalent/ton).

Although the transparency of the bottomed preform (PF) described in the above-mentioned (5) was somewhat unsatisfactory (Δ) when visually observed, the haze value of the bottle barrel part of the 5000th bottle prepared by bottle continuous molding was 3.5% and the haze value of the bottle barrel part of the 10000th bottle prepared thereby was 3.9%. The results are shown in Table 2.

TABLE 1

|  |  | Example 1 | Example 2 | Example 3 | Example 4 |
|---|---|---|---|---|---|
| Amount of catalyst | Antimony (ppm) | 280 | 280 | 280 | 280 |
|  | Hindered phenol structural unit (equivalent/ton) | 0.34 | 1.62 | 0.041 | 0.64 |
| Resin composition characteristics | Intrinsic viscosity (dL/g) | 0.78 | 0.78 | 0.78 | 0.77 |
|  | Cyclic trimer (ppm) | 4500 | 4000 | 3800 | 3900 |
|  | AA (ppm) | 3.2 | 3.6 | 3.0 | 3.5 |
|  | ΔCT (ppm) | 4100 | 4500 | 4800 | 4700 |
|  | TOD | 0.04 | 0.03 | 0.06 | 0.04 |
| Bottle characteristics 5000th | Intrinsic viscosity (dL/g) | 0.78 | 0.78 | 0.76 | 0.77 |
|  | Cyclic trimer (ppm) | 4900 | 4400 | 4100 | 4100 |
|  | AA (ppm) | 9.2 | 8.6 | 9.6 | 9.0 |
|  | Barrel part haze (%) | 1.8 | 2.0 | 2.1 | 1.9 |
|  | Degree of crystallinity of barrel part (%) | 35 | 36 | 36 | 35 |
|  | Leakage | Absent | Absent | Absent | Absent |

TABLE 1-continued

|  |  | Example 1 | Example 2 | Example 3 | Example 4 |
|---|---|---|---|---|---|
|  | Barrel part deformation | ○ | ○ | ○ | ○ |
| Bottle characteristics 10000th | Intrinsic viscosity (dL/g) | 0.78 | 0.78 | 0.76 | 0.77 |
|  | Cyclic trimer (ppm) | 4900 | 4400 | 4100 | 4100 |
|  | AA (ppm) | 9.2 | 8.6 | 9.6 | 9.0 |
|  | Barrel part haze (%) | 2.0 | 2.1 | 2.7 | 2.1 |
|  | Degree of crystallinity of barrel part (%) | 35 | 36 | 36 | 35 |
|  | Leakage | Absent | Absent | Absent | Absent |
|  | Barrel part deformation | ○ | ○ | ○ | ○ |

TABLE 2

|  |  | Comparative Example 1 | Comparative Example 2 | Comparative Example 3 | Example 5 |
|---|---|---|---|---|---|
| Amount of catalyst | Antimony (ppm) | 280 | 280 | 280 | 280 |
|  | Hindered phenol structural unit (equivalent/ton) | 0 | 1.96 | 0.34 | 0.43 |
| Resin composition characteristics | Intrinsic viscosity (dL/g) | 0.78 | 0.78 | 0.78 | 0.78 |
|  | Cyclic trimer (ppm) | 4500 | 4200 | 7200 | 4600 |
|  | AA (ppm) | 3.2 | 3.3 | 3.0 | 3.0 |
|  | ΔCT (ppm) | 4300 | 4100 | 3100 | 4300 |
|  | TOD | 0.20 | 0.06 | 0.04 | 0.04 |
| Bottle characteristics 5000th | Intrinsic viscosity (dL/g) | 0.75 | 0.78 | 0.77 | 0.77 |
|  | Cyclic trimer (ppm) | 4800 | 4500 | 8000 | 4800 |
|  | AA (ppm) | 10.1 | 9.5 | 9.8 | 9.6 |
|  | Barrel part haze (%) | 1.8 | 1.8 | 2.0 | 3.5 |
|  | Degree of crystallinity of barrel part (%) | 35 | 35 | 36 | 36 |
|  | Leakage | Absent | Absent | Absent | Absent |
|  | Barrel part deformation | ○ | ○ | ○ | ○ |
| Bottle characteristics 10000th | Intrinsic viscosity (dL/g) | 0.75 | 0.78 | 0.77 | 0.77 |
|  | Cyclic trimer (ppm) | 4800 | 4500 | 8000 | 4800 |
|  | AA (ppm) | 10.1 | 9.5 | 9.8 | 9.6 |
|  | Barrel part haze (%) | 4.8 | 4.1 | 4.6 | 3.9 |
|  | Degree of crystallinity of barrel part (%) | 35 | 35 | 36 | 36 |
|  | Leakage | Absent | Absent | Absent | Absent |
|  | Barrel part deformation | ○ | Δ | ○ | ○ |

INDUSTRIAL APPLICABILITY

The polyester resin composition according to the present invention is excellent in long-term continuous moldability at the time of being molten and molded and is capable of efficiently producing a polyester molded article excellent in transparency and heat-resistant dimensional stability, and furthermore, a molded article obtained from the polyester resin composition is suitably used as a container or packaging material for foods, beverages or the like, in particular a heat-resistant container, and greatly contributes to the industrial world.

The invention claimed is:

1. A polyester blow-molded article comprising a polyester resin composition containing 0.035 to 1.75 equivalent/ton of a hindered phenol structural unit and containing at least one selected from the group consisting of antimony compounds as a polymerization catalyst, the cyclic trimer content thereof being less than or equal to 0.5% by mass, the acetaldehyde content thereof being less than or equal to 50 ppm and the intrinsic viscosity thereof being 0.68 to 0.90 dL/g.

2. The polyester blow-molded article according to claim 1, wherein said polyester resin composition is a polyester resin composition not subjected to a deactivation treatment of the polymerization catalyst.

3. The polyester blow-molded article according to claim 1, wherein said hindered phenol structural unit is derived from a hindered phenol compound containing no metal salt structure.

4. The polyester blow-molded article according to claim 1, wherein the thermal oxidative degradation parameter (TOD) of the polyester resin composition is less than or equal to 0.10.

5. A method for molding a polyester blow-molded article with a cyclic trimer content less than or equal to 0.5% by mass, an acetaldehyde content less than or equal to 50 ppm and an intrinsic viscosity of 0.68 to 0.90 dL/g, comprising the steps of:

preparing a polyester resin composition containing 0.035 to 1.75 equivalent/ton of a hindered phenol structural unit and containing at least one selected from the group consisting of antimony compounds as a polymerization catalyst; and performing molding greater than or equal to 10000 times per one mold continuously without cleaning a mold for blow molding.

6. The method for molding a polyester blow-molded article according to claim 5, wherein said polyester resin composition is a polyester resin composition not subjected to a deactivation treatment of a polymerization catalyst.

7. The method for molding a polyester blow-molded article according to claim 5, wherein said hindered phenol structural unit is derived from a hindered phenol compound containing no metal salt structure.

8. The polyester blow-molded article according to claim 2, wherein said hindered phenol structural unit is derived from a hindered phenol compound containing no metal salt structure.

9. The polyester blow-molded article according to claim 2, wherein the thermal oxidative degradation parameter (TOD) of the polyester resin composition is less than or equal to 0.10.

10. The polyester blow-molded article according to claim 3, wherein the thermal oxidative degradation parameter (TOD) of the polyester resin composition is less than or equal to 0.10.

11. The method for molding a polyester blow-molded article according to claim 6, wherein said hindered phenol structural unit is derived from a hindered phenol compound containing no metal salt structure.

* * * * *